United States Patent

[11] 3,752,393
[45] Aug. 14, 1973

Moseley

[54] DIGITAL FLOW CALCULATOR
[75] Inventor: L. Max Moseley, Dallas, Tex.
[73] Assignee: Teledyne Industries, Inc. (Geotech Division), Dallas, Tex.
[22] Filed: Aug. 2, 1971
[21] Appl. No.: 168,110

[52] U.S. Cl............................. 235/151.34, 73/211
[51] Int. Cl........................... G06f 15/32, G01f 1/00
[58] Field of Search.................. 235/151.34, 92 FL, 235/92 MT; 73/211

[56] References Cited
UNITED STATES PATENTS

| | | | |
|---|---|---|---|
| 3,588,481 | 6/1971 | Stroman | 235/151.34 |
| 3,701,280 | 10/1972 | Stroman | 73/194 M |
| 3,643,076 | 2/1972 | Bell et al. | 235/151.34 X |
| 3,017,090 | 1/1962 | Strachey et al. | 340/146.1 X |

OTHER PUBLICATIONS

Moss, S. A. Measurement of Flow of Air and Gas with Nozzles. In Trans. ASME. 50(2): p. APM–3–8 to APM–3–9. Jan.–Apr. 1928.

Primary Examiner—Malcolm A. Morrison
Assistant Examiner—R. Stephen Dildine, Jr.
Attorney—Arthur E. Dowell, Jr. et al.

[57] ABSTRACT

A pre-programmed calculator illustrated by an embodiment which repeatedly solves expressions for determining the gas flow through an orifice in a pipeline, the calculator performing its calculations using digital techniques, and the measured flow parameters, including in this example the gas temperature, pressure, specific gravity and differential pressure across the orifice, all being changed to digital form prior to such calculations. Numerical constants used in the expressions being solved are inserted into the calculator in digital form by manually presettable switches. The gas flow calculated in standard cubic feet is subsequently converted to thousands of standard cubic feet and cumulatively displayed, and the remainder after each such conversion is added to the next calculated flow value prior to its conversion so that each remainder is preserved. The expression for gas flow which is solved by the present calculator is corrected by including a supercompressibility factor which is calculated anew during each new solution of the flow expression, and all calculations are repeated at a high rate to achieve high accuracy.

10 Claims, 5 Drawing Figures

Patented Aug. 14, 1973

DIGITAL FLOW CALCULATOR

This invention relates to a pre-programmed calculator for receiving measured parameters relating to fluid flow and repeatedly calculating the flow while cumulatively displaying the quantity thereof.

It is a principal object of this invention to provide a practical calculator capable of determining at a high repetition rate the flow of a fluid, while at the same time providing greater accuracy and repeatability for the calculations. The present invention is illustrated in terms of an embodiment in which a digital calculator is pre-wired to calculate the quantity of gas flowing through an orifice plate in a gas pipeline, the calculator receiving electrical signals representing gas pressure, temperature, specific gravity and differential pressure across the orifice, and calculating the flow in standard cubic feet to an accuracy of about one part in a thousand. This accuracy is contributed to by the use of digital calculation techniques and also by a feature of the calculator in which the supercompressibility factor of the gas is re-calculated for each gas flow calculation, i.e., every 2 seconds in the presently manufactured form of the calculator.

The prior art relating to gas flow calculators has for the most part used analog techniques to add, multiply, divide or take square roots, but these calculators generally suffer from a tendency of the components to drift because of aging and/or temperature changes so that their accuracy is poor. The use of digital calculating techniques eliminates this type of error.

The American Gas Association Manual NX19 provides information relating to practical expressions for calculating volumetric gas flow through a metering orifice, and these expressions include the general expression for the quantity of gas $Qh = C' \sqrt{P \cdot Pf}$ in cubic feet/hour, where $C'$ is the orifice constant, $\Delta P$ is the differential pressure across the orifice, and $Pf$ is the static absolute gas pressure. From this general equation, a practical expression has been developed which has been corrected for several factors having an effect upon the flow as measured at an orifice, namely gas temperature $T$, specific gravity $G$, and a supercompressibility factor $Fpv$ which compensates the flow expression for deviation of the hydrocarbon gas mixture being measured from perfect gas behavior. The expression solved in the present illustration to determine gas flow in standard cubic feet per sampling interval is:

$$Qh = (C' \cdot Fpv)/1800 \sqrt{(\Delta P \cdot Pf \cdot 520)/[G(T+460)]}$$

(1)

The above mentioned Gas Association Manual includes empirical curves showing variations of supercompressibility with gas pressure $Pf$ and temperature $T$. An expression for $Fpv$ has been written to be operative within the anticipated range of temperatures and pressures expected to be encountered by fitting the expression to the slope of the appropriate curve over this range. For this purpose it is assumed that the absolute pressure will vary between zero and 1200 p.s.i., and that the temperature will vary within the range 30° to 120° F. The resulting expression is:

$$Fpv = 1 + (Pf)/[100(T+60)]$$

(2)

It is an object of this invention to provide a digital calculator which solves the expressions (1) and (2) to determine gas flow.

It is another object of the invention to provide a calculator in which the numerical constants appearing in expressions (1) and (2), which constants are inserted into the calculator in digital form by adjustable switch means, can be easily set within a selectable range of values so that the calculator can be readily corrected to improve the accuracy of its solutions since they include factors empirically arrived at.

Still a further object of the invention is to provide a calculator having a display showing gas flow rounded off to some standard scale factor, in the illustrated case thousands of cubic feet per hour, and in which the remainder that results from each rounding-off of the calculated flow is preserved and added to the next calculated flow before it is rounded off, whereby the accuracy of the displayed values is closely maintained.

It is another object of the invention to economize on the bit capability required for the various components of the calculator when solving equations (1) and (2), the economy being realized by computing a sequence of sub-calculations which are carefully selected to prevent the number of bits required from becoming greater than the number of bits provided in the calculator components. In a practical calculation the orifice constant $C'$ might typically be 10,000 for a 21 inch pipeline and go down perhaps to 1000 for a small pipeline; the calculated value of the supercompressibility factor $Fpv$ might typically range from 1.00 to 1.11; the pressure $Pf$ might typically go up to 1200 p.s.i.; the temperature might typically be between 30° and 120° F; and the specific gravity of the gas expressed as a ratio with air might typically range around 0.58 to 0.68. These values are considered merely illustrative and are not intended to set limits. In the working embodiment of the invention the gas flow is calculated 1800 times per hour and the digital display is updated after each individual calculation.

Other objects and advantages of the invention will become apparent during the following discussion of the drawings, wherein:

FIGS. 3, 4, and 5 when placed side-by-side comprise a composite diagram showing the embodiment of FIG. 1 in greater detail.

Figure 1:
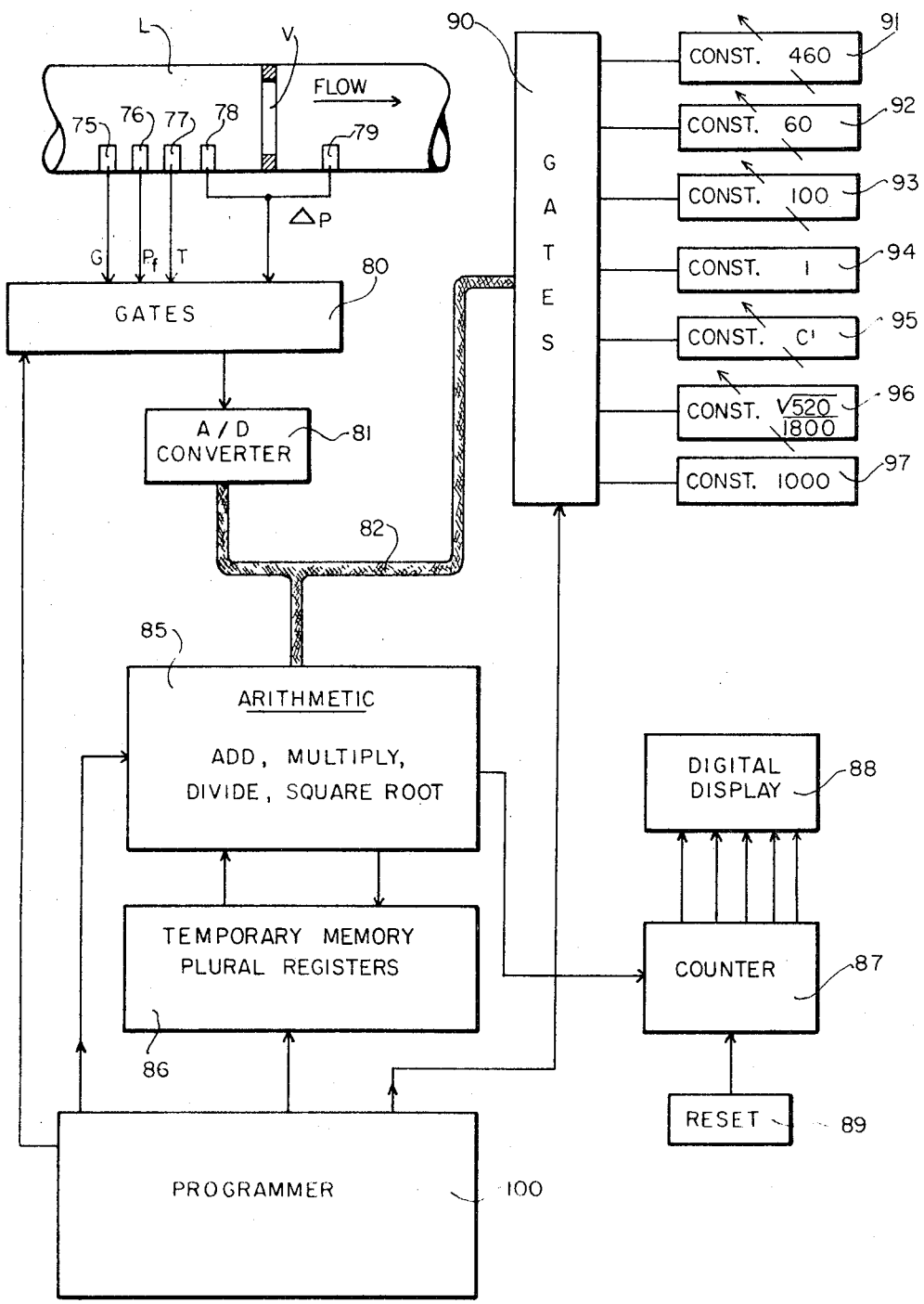
FIG. 1 is a block diagram illustrative of the present invention.

Referring now to the drawings, FIG. 1 shows a simplified block diagram of an embodiment according to the present invention which is described hereinafter for illustrative purposes as being typical. The calculator is designed as discussed above to solve gas flow expression (1) which includes a supercompressibility factor set forth above in expression (2), and these two expressions include a number of different terms, some of which are constant values selected to match a particular pipeline installation and to take care of certain fixed-value terms in the expressions, and some of which are variables which are being measured continuously so that during each successive calculation, the determined flow of gas will be newly updated. The latter type of measurements are made at a section of pipeline L having an orifice V as shown at the top of FIG. 1. Within the pipeline L is located a transducer 75 which is sensitive to the instantaneous specific gravity G of the gas. A pressure measuring device 76 measures the absolute gas pressure Pf in pounds per square inch, and a temperature measuring device 77 provides a continuous measurement of temperature. Two more pressure sensitive devices 78 and 79 located on opposite sides of the orifice V provide a differential pressure measurement $\Delta P$ thereacross. These four measurements obtained by the devices 75 through 79 inclusive provide analog inputs to a series of gates 80 which are operative one at a time to deliver a selected analog measurement to the A/D convertor 81 which delivers digital equivalents to the input bus 82 of the arithmetic secton 85 of the calculator.

Each of the other seven inputs comprises a constant digital value representing a number which is preselected by the operator of the system, for instance using a plurality of manual switches so that a suitable binary number can be selected by appropriate pre-setting of the switches. These digital numbers are then made available to a series of gates 90 which can be selected to apply any one of the available digital number to the input bus 82 of the arithmetic section 85 of the calculator. These seven inputs are obtained from the source boxes 91 thorugh 97 in the upper right-hand corner of FIG. 1, and five of them are made easily adjustable, in view of the fact that they represent empirical quantities which are subject to periodic adjustment by the operator of the system in order to obtain maximum accuracy during calculation of the gas flow. The adjustability of the 5 parameters is represented by the arrows drawn through the boxes 91, 92, 93, 95 and 96. On the other hand, the output constant 1 from the box 94 and the output constant 1,000 from the box 97 are not adjustable since they never require changing.

The calculator is controlled by a programmer 100 which contains a pre-recorded fixed program requiring substantially no alternatives in view of the fact that the calculator always solves the same expressions over and over again during each successive program sequence, each sequence taking 2 seconds time to complete. The program therefore repeats itself 1800 times per hour, providing 1800 additional flow increments to enter into a counter 87 which then operates a digital display 88 to cumulatively display the total gas flow through the pipeline L occurring since the system was last reset. Such reset can be accomplished by a reset device 89 which can either be operated automatically each time the total flow accumulated in the digital display 88 is read from the calculator and somehow suitably recorded, or else the reset 89 can be manually operated by personnel reading the digital total gas flow shown in the display 88 and reocridng it in a manually kept record. It is, of course, not necessary that the display system be reset at all if it is read by noting when it counts through zero and begins counting upwardly again.

The arithmetic portion of the calculator 85 solves expressions (1) and (2) once every 2 seconds while receiving on the input bus 82 sequentially selected inputs from the measuring devices 75 through 79 and from the constant numeral sources 91 through 97. As will be described in connection with FIG. 2, and also in connection with the more detailed diagram including FIGS. 3, 4, and 5, the programmer 100 operates the appropriate gates 80 and 90 during appropriate steps in the sequential program and also instructs the arithmetic unit as to what functions it should perform in connection with each of the input quantitites arriving on the digital bus 82. The system does not solve the complete expression (1) all at one time, but instead makes multiple sub-calculations whice are then later combined to complete the overall calculation of flow quantity for that particular cycle of the programmer. The breaking down of expression (1) into sub-calculations is done for the purpose of reducing the maximum bit capability required in the calculator. By performing partial arithmetic functions upon certain selected ones of the input quantities, it is possible to continuously work with digital numbers which do not exceed a certain number of bits, and therefore can be stored and handled by equipment of economical bit capability. As these sub-quantities are calculated they are individually stored in temporary memory means 86 having a multiplicity of separate registers each capable of storing a sub-calculation value. These registers are for simplicity of illustration all grouped together in the box 86 in FIG. 1. Ultimately, when the various sub-calculated values are combined in the arithmetic portion 85, a digital quantity generally representing a number of cubic feet flow per unit time will be obtained, and this number will be divided by a constant scale factor of 1000 taken from the box 97 to provide an output to the counter 87 in terms of thousands of cubic feet of flow. It is these thousands of cubic feet which appear on the wire 84 and on the digital display 88, and means is provided which will be explained hreinafter for preserving the remainder, which could not be integrally divided by 1000, for inclusion in the next quantity Qh calculated during the next cycle of the programmer 100 as will be described in connection with FIGS. 2 through 5 inclusive.

Figure 2:
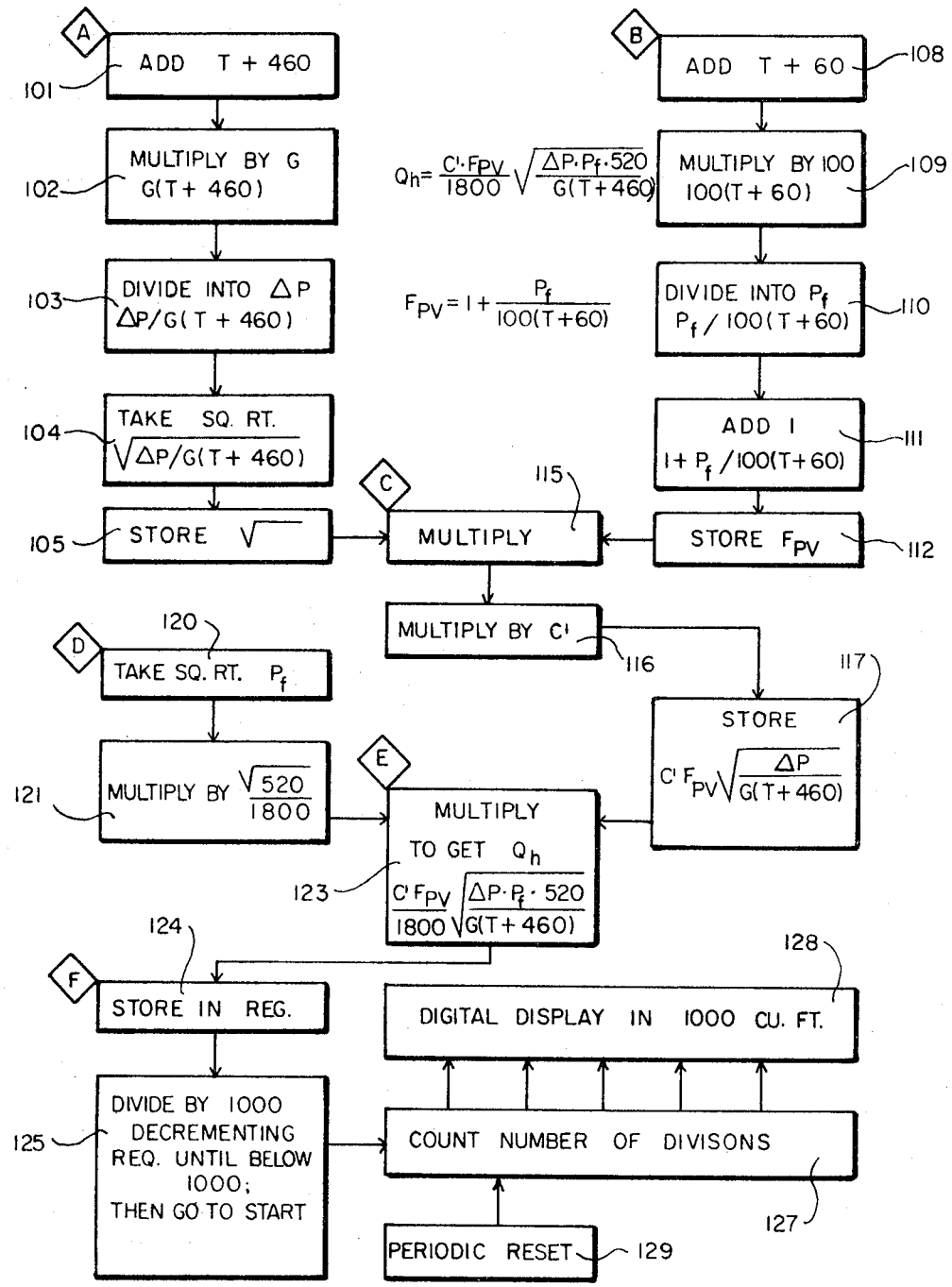
FIG. 2 is a flow diagram illustrating the sequence in which sub-calculations are performed in solving equations (1) and (2)

Referring now to FIG. 2, this figure illustrates in somewhat simplified form the arithmetic functions or steps performed in one calculation of flow during one cycle of the programmer 100, and in particular, FIG. 2 illustrates the manner in which expression (1) is broken down and solved by a series of sub-calculations which are ultimately combined to provide a final output representing Qh. Expressions (1) and (2) are repeated in the upper central portion of FIG. 2.

Figure 3:
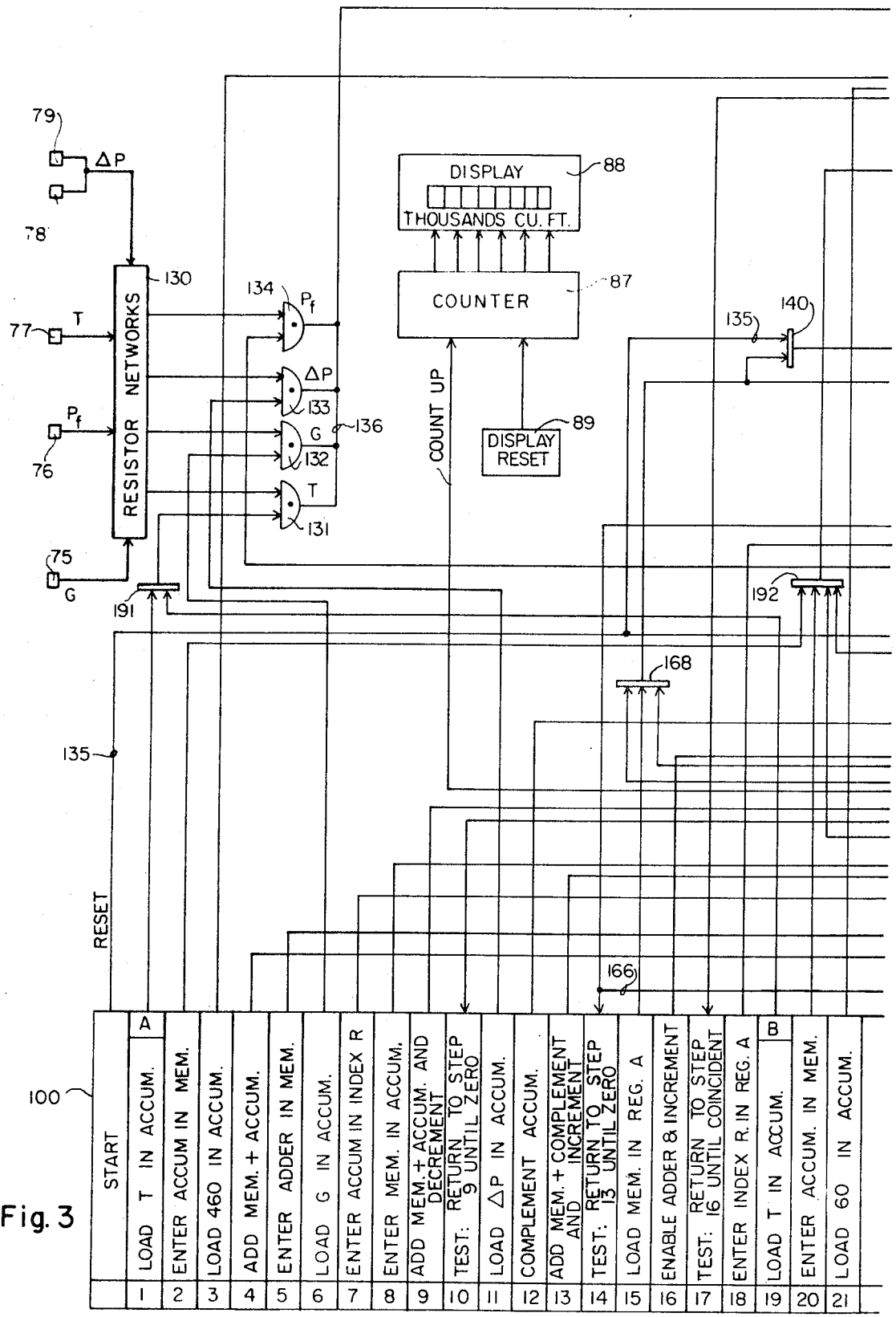
Figure 4:
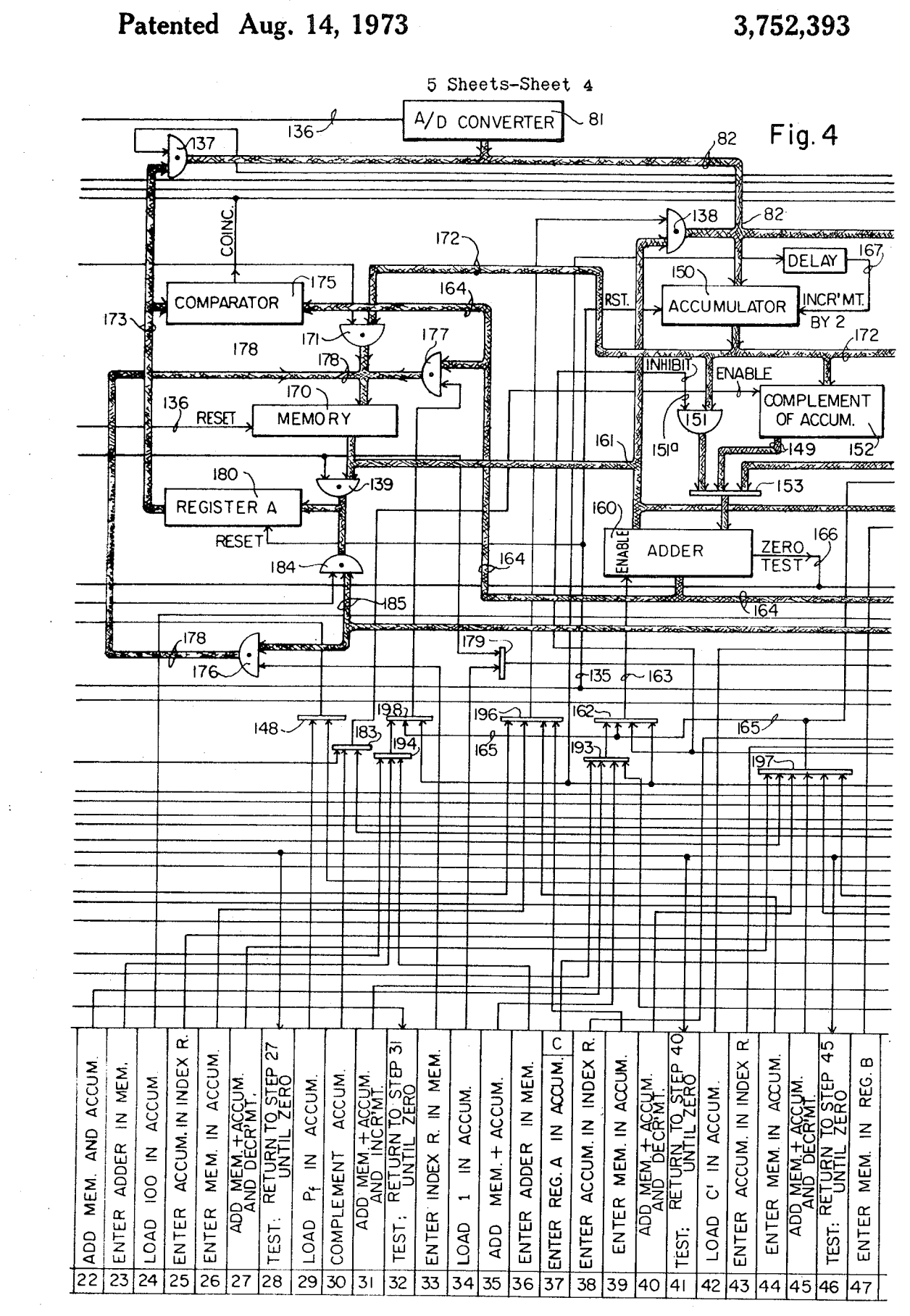
Figure 5:
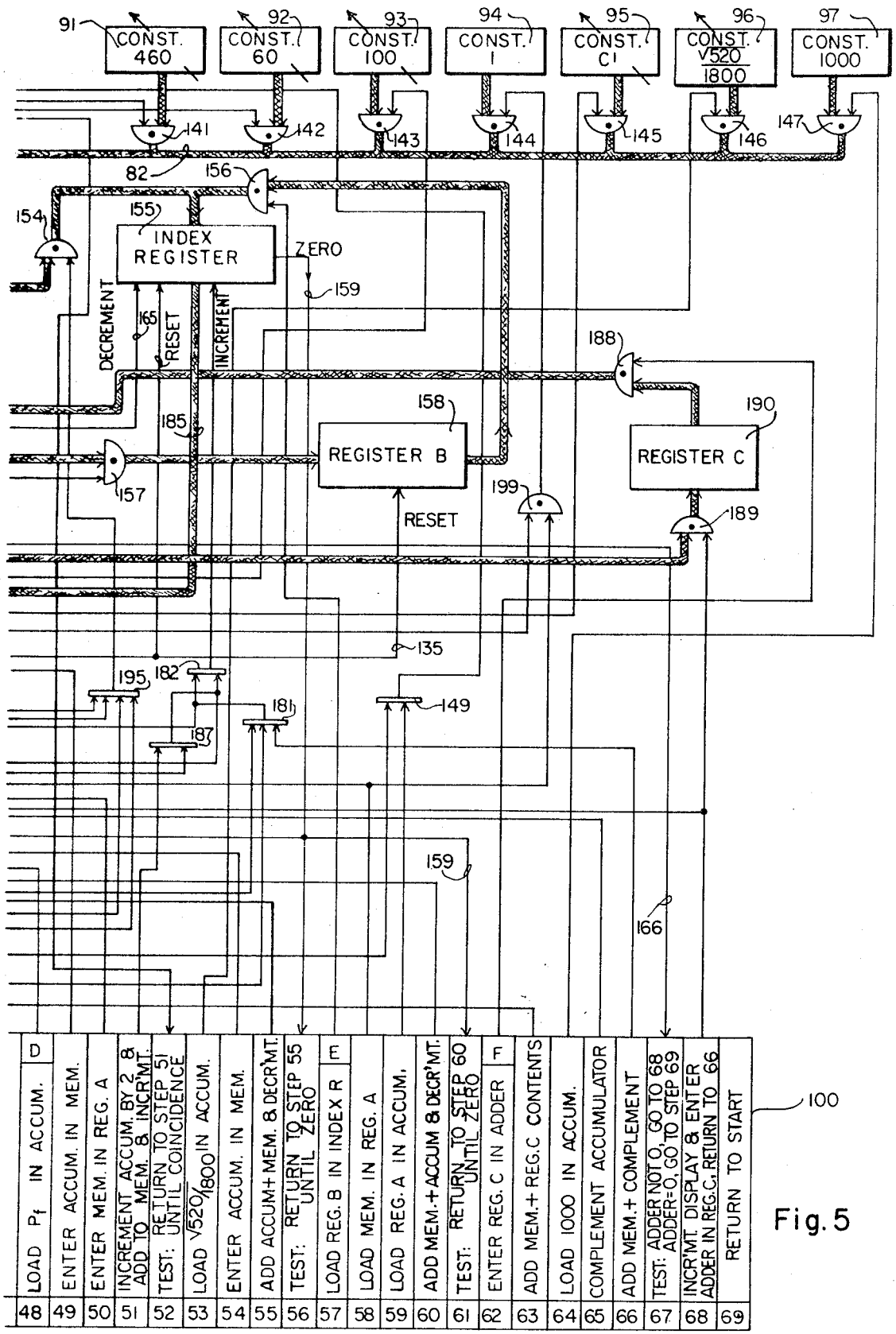

For easy identification and cross reference between FIG. 2 on the one hand and the more detailed drawings including FIGS. 3, 4, and 5 on the other hand, the mathematical calculations are divided into six sub-calculations respectively labelled A, B, C, D, E, and F. The sub-calculation A calculates the square root of $\Delta P/G(T+460)$. This calculation includes only part of what is contained within the square root radical of expression (1). This sub-calculation includes in the step 101 the addition of T plus the constant 460 taken from box 91. In step 102, the sum obtained in box 101 is multiplied by G. In step 103 the differential pressure $\Delta P$ is divided by the product obtained in step 102, and in step 104 the square root is taken of the dividend obtained in step 103, and this quantity is stored temporarily in step 105, for instance in one of the registers 86 of FIG. 1. The stored quantity is the square root of $\Delta P/G(T+460)$.

The partial square root quantity stored in step 105 is left unused for the time being and a new sub-calculation B is commenced in step 108 which is a complete solution of the right-hand side of the expression for Fpv contained in equation (2). In step 108 the temperature T is added to a constant 60 obtained from box 92. In step 109 the sum obtained in step 108 is multiplied by a constant 100 obtained from the box 93. In step 110, the product obtained in step 109 is divided into the absoltue gas pressure Pf in order to obtain a dividend, and in step 111 this dividend is added to a constant 1 obtained from box 94, and the sum obtained in this manner comprises the supercompressibility factor Fpv, and is temporarily stored in step 112.

In sub-calculation C the supercompressibility factor stored in step 112 is multiplied by the square root stored in step 105 to form in step 115 a product which is immediately multiplied by another adjustable constant value C', which is a constant representing the orifice V and is empirically based upon such dimensional factors as the ratio of the diameter of the orifice to the overall diameter of the pipeline L in which it is located. The resulting product is then temporarily stored in step 117, for instance in one of the registers 86, and comprises the quantity $C' \cdot Fpv \sqrt{\Delta P/G(T+460)}$.

The arithmetic then proceeds to sub-calculation D in which the square root of the product of the other terms under the square root sign in expression (1) is calculated. For this purpose, the absolute pressure Pf is taken into the input bus 82, and the square root of this quantity is taken in step 120, and this square root is multiplied by a constant $\sqrt{520/1800}$ taken from box 96 where it has previously been inserted by manual switches. The $\sqrt{520/1800}$ multiplied by the $\sqrt{Pf}$ is then fed into the arithmetic portion 85 together with the stored quantity $C'Fpv \sqrt{\Delta P/G(T+460)}$, and the output from the multiplication in step 123 is the solution of expression (1), namely the value Qh representing the flow quantity in cubic feet for the present calculation sequence. This solution in cubic feet is then stored in one of the registers 86 in the step 124.

The final calculation F is then performed on the stored quantity Qh in step 125 which divides Qh by a scaling factor comprising a constant 1000 taken from the box 97 in order to obtain the gas flow in thousands of cubic feet. The division by 1000 in step 125 is performed over and over again until the number stored in step 124 is no longer divisible by 1000, and each time such a division is successfully performed, step 125 advances by 1 the number in counter 87, step 127. The digital display is then updated in step 128 each time the number counted in step 127 is advanced so that the digital display reads in terms of thousands of cubic feet flow. When the number stored in storage step 124 is no longer divisible by 1000, the remainder is retained, and the system starts a new cycle of calculation in order to determine a new quantity Qh, which will then be added to the remainder left over during the previous step 124. Periodically, the number of thousands of cubic feet of gas has to be copied from the digital display accumulated in step 128, namely before the capability of the display is exceeded. For this purpose any suitable means can be used, and after the reading has been taken from the display, the display may be reset, such reset step 129 being accomplished either automatically or manually as discussed above.

Turning now to a discussion of the composite diagram of FIGS. 3, 4 and 5 representing a more detailed description of the system, it will be noted that certain boxes appearing in FIG. 1 are repeated in the more detailed diagram, namely the programmer 100, the sensing devices 75 through 79, and the constant number sources 91 through 97 inclusive. In addition, the digital display 88 is repeated together with its counter 87 and the reset 89. The A/D convertor 81 also appears in the more detailed version, but the gates 80 and 90 as well as the arithmetic portion 85 and the memory portions 86 have been broken down into their individual major components.

Referring now to FIGS. 3, 4 and 5, which when taken side-by-side form a more detailed block diagram of the illustrative embodiment, the programmer 100 is extended all the way across all three drawings so as to provide enough room to show each of the major steps of the programmer. The major part of the arithmetic is accomplished using an accumulator 150 as an input device, and usually adding the contents of a memory 170 to it using a binary adder 160. Those paths which represent multiple wire parallel digital paths are shown in the form of a heavier cable which is assumed to contain enough wires to carry the various parallel bits. Information from the main calculating system can be selectively stored either in the register A which bears the reference numeral 180, or else in register B which bears the reference numeral 158, and in addition there is an index register 155 which is useful during multiplication, division and square root taking. The register C bearing the reference numeral 190 is used to receive the results of each complete flow calculation in such a way as to retain the remainder after that flow calculation has been converted to thousands of cubic feet of gas. A plurality of gates appears in the system for control by the programmer 100 during each calculation cycle solving the expressions (1) and (2) as discussed above in general terms.

Following through a complete cycle of the programmer 100 the cycle begins each time by an output from the START step appearing at the left-hand end of the programmer in FIG. 3 whereupon a reset signal appears on wire 135 and operates to reset the accumulator 150, the index register 155, the memory 170, the register A labelled 180 and the register B labelled 158. The programmer then moves to step 1 in which an output is delivered through the OR gate 191 to enable the analog AND gate 131 and pass the temperature T as measured by the temperature sensor 77 from a suitable resistor network 130 into the A/D convertor 81 so that a multiple-digit binary temperature representation passes through the input bus 82 and into the accumulator 150. The programmer then moves to step 2 and delivers an output signal through the gate 192 to enable the AND gate 171 and pass the digital temperature from the accumulator 150 via the cable 172 into the memory 170. When the programmer 100 moves to step 3 an output therefrom enables the gate 141, which actually comprises a plurality of gates suitable for passing the digital number 460 from the source box 91 onto the input bus 82 of the accumulator 150. Thus, at the present time the memory 170 contains a digital representation of the gas temperature T and the accumulator contains a digital representation of the number 460. The programmer then moves to step 4 and passes a signal through the OR gate 193 and through the OR gate 162 onto the wire 163 which enables the adder 160. The adder delivers its output on cable 164, and when the programmer moves on to step 5, this output of the programmer passes through the OR gate 194 and the OR gate 198 and enables the AND gate 177 which then passes the output of the adder 160 from cable 164 into cable 178 and into the memory 170 where it replaces the prior contents of the memory. The steps so far included what was shown as step 101 in FIG. 2.

Now the programmer moves on to step 6 in FIG. 3 and commences step 102 of FIG. 2. In step 6 an output is delivered to enable the analog AND gate 132 and thereby pass the analog signal G representing the specific gravity of the gas to the wire 136. The G signal is then converted by the converter 81 into a digital signal representing specific gravity and is entered through the input bus 82 into the accumulator 150 where it displaces the previous contents of the accumulator. Since the step 102 of FIG. 2 involves multiplication, during step 7 of the programmer the AND gate 154 is enabled through the OR gate 195 to pass the digital G signal from the accumulator through cable 172 and into the index register 155. Recalling for the moment that the memory 170 contains the sum of the temperature plus the constant 460, this sum is now transferred through the cable 161 from the memory 170 into the accumulator 150 as a result of an output appearing at step 8 of the programmer 100 to enable the gate 138 through the OR gate 196. This sum T+460 which is now located in the accumulator is multiplied by the specific gravity G of the gas which is now contained in the index register 155 by adding the contents of the accumulator and the memory 170 through the adder 160 while decrementing by 1 the index register as many times as is necessary to reduce the content of the index register 155 to zero. Thus, when the programmer moves on to provide an output at step 9, this output passes through the OR gate 197 onto the wire 165, which does three things, namely it passes through the OR gate 162 and enables the adder 160 on wire 163; it decrements the index register by 1; and it passes through the OR gate 198 to enable the AND gate 177 and thereby insert the output of the adder appearing on wire 164 into the memory 170 by way of cable 178. The programmer then passes on to step 10 in which it receives via the wire 159 a signal coming out of the index register 155 and indicating whether the index register has reached zero or not. Logic within the programmer 100 causes it to return to step number 9 if the input to the programmer on wire 159 has not reached zero, and in this event the sum of T+460 appearing in the accumulator is again passed through the adder 160 where it is again summed with the cumulative content of the memory 170 and the index register is decremented once more. As a result, a new sum, comprising 3 times T+460, is entered into the memory 170. The programmer then goes again to step 10 in which another test is made. If the index register still has not passed through zero the content of the accumulator T+460 is again added to the content of the memory to provide a new output of the adder to the memory 170 which comprises 4 times T+460. Eventually, when the index register 155 reaches zero, the programmer 100 will not return to step 9 but will proceed to step 11. At this time, the memory now contains G(T+460), and step 102 of FIG. 2 has been completed.

Step 11 of the programmer shown in FIG. 3 commences step 103 of FIG. 2 in which the contents of the memory are to be divided into the differential pressure $\Delta P$. For this purpose, in step 11 the accumulator is loaded with $\Delta P$ which occurs as a result of enabling the analog gate 133 and passing the analog signal $\Delta P$ onto the wire 136 where it passes through the A/D convertor and into the accumulator 150 via the input bus 82.

Thus, the accumulator now contains the quantity $\Delta P$ in digital form. The programmer then passes on to step 12 whereupon an enabling signal is passed through the OR gate 183 to enable the complement circuit 152 which provides on its output bus 149 the complement of the contents of the accumulator 150, the complement signal being made available to the adder 160 through the OR gate 153. The programmer then proceeds to step 13 which provides an output via wire 151a to block the gate 151 and another output which adds the contents of the memory to the complement of $\Delta P$ by enabling the wire 163 through the OR gates 181 and 162. The signal from step 13 of the programmer also passes from the OR gate 181 through the OR gate 182 and increments the index register by 1. Thus, the quantity G(T+460) in the memory 170 is added in step 13 to the complement of the differential pressure $\Delta P$ and each time this is done the index register is incremented by 1. Naturally, each time the complement of $\Delta P$ is added to the contents of the memory, the latter is reduced in size. After each such reduction in step 13, the programmer receives on wire 166 a signal which comprises an output from the adder, and if this output has not passed through zero the programmer is then returned to step 13 to perform the complementary addition again. However when at last the output of the adder on wire 166 indicates that it has passed through zero, the programmer then moves on to step 15.

Having completed step 103 as shown in FIG. 2, the programmer moves to step 15 and begins step 104 of FIG. 2 which involves taking the square root of the number $\Delta P/G(T+460)$. When the programmer moves to step 15 the output at this step enables the AND gate 139 through the OR gate 168 and loads the content of the memory 170 into the register A, which then contains $\Delta P/G(T+460)$. The output at step 15 also passes through the gate 140 to wire 136 and resets the memory 170 to zero. Moreover, the output at step 15 passes through the OR gate 179 and enables the AND gate 144 which isnerts the number 1 into the accumulator 150 through the input bus 82. The programmer 100 then moves to step 16, and the output corresponding with this step passes through the gate 187 and enables the adder 160 through gate 162 to add the accumulator content and store it in the memory through the AND gate 177. This addition involves adding from the accumulator the number 1 to the zero content in the memory, thereby providing a 1 in the memory 170. Moreover output from the gate 187 also advances the accumulator content to a count of 3 by incrementing the accumulator by 2 via the delay 167. The output from the programmer at step 16 also passes through the OR gate 182 and increments the index register 155 by 1 to a total count of 1. At programmer step 17 an output is taken by the programmer 100 from the comparator 175 which compares the output of the adder with the number to be square rooted in register A. Since the output from the adder now reads 1 and the register A contains $\Delta P/G(T+460)$, coincidence will not be found by the comparator 175 this time, and therefore the test made at step 17 will fail. Thereupon, the programmer will return to step 16 and again provide an output which passes through the OR gate 162 and enables the adder to add to the number 1 appearing in the memory 170 the number 3 contained in the accumulator 150, thereby providing the number 4 at the output of the adder which passes through the enabled gate 177 and is stored in the memory 170. Also, through the delay circuit 167 the accumulator is again incremented by 2 so that its count is now 5 whereas the count now in the memory 170 is 4. Assuming that the number to be square rooted in the register A is greater than 4, coincidence again fails and therefor the programmer returns from step 17 to step 16 whereupon the number 5 in the accumulator is added to the number 4 in the memory 170 to produce the number 9 therein. The accumulator is therefore incremented by 2 through the delay 167 so that it subsequently reads 7 whereas the memory 170 reads 9. This process continues until the adder has an output on cable 164 which coincides with the output of register A on cable 173 thereby to produce coincidence at step 17. When this coincidence finally occurs the programmer proceeds to step 18. At this point, the number in the index register which was incremented by 1 during each step 16 comprises the square root of the numbers appearing at the adder 160 and in the register A, and therefore the index register contains the answer being sought and comprising the square root of $\Delta P/G(T+460)$. At step 18 the gate 184 is enabled and the index register reads out its contents through the gate 184 and through the wire 185 and inserts it into the register A for storage temporarily. The square root steps correcpond with step 104 of FIG. 2, and the storage in register A of the square root from the index register corresponds with step 105 of FIG. 2. This completes sub-calculation A.

Sub-calculation B commences at step 19 of the programmer 100, corresponding with step 108 of FIG. 2. The output from step 19 passes through the OR gate 191 and enables the gate 131 to apply the analog temperature to the wire 136, whence it is converted into digital form by the convertor 81 and entered into the accumulator 150 via the input bus 82. The programmer then moves to step 20 whose output passes through the gate 192 and enables the gate 171, whereupon the temperature T in the accumulator is loaded via the cable 172 into the memory 170. At step 21 the constant 60 is loaded into the accumulator through the enabled gate 142 and the input bus 82. Therefore, the memory 170 now contains the digital temperature T and the accumulator contains the number 60 in binary digital form. At step 22 in FIG. 4 the signal passes through the gate 193 and through the OR gate 162 to enable the adder 160 via the enable wire 163. Thereupon the adder adds the memory to the accumulator to produce on cable 164 a number representing T+60. At step 23, the output of the programmer passes through the gate 194 and through the gate 198 and enables the AND gate 177, thereby passijng the output of the adder into the memory 170 by way of the cable 178.

The system then passes to the next step which corresponds with step 109 in FIG. 2 and is step 24 in FIG. 4. At step 24 the AND gate 143 is enabled to pass a constant 100 from the source box 93 into the accumulator through the cable 82. Since the present effort is to accomplish multiplication, the content of the accumulator is entered into the index register at step 25 wherein a signal passes through the OR gate 195 and enables the AND gate 154. At step 26 the output signal passes through the OR gate 196 and enables the AND gate 138 which enters the contents of the memory 170 into the accumulator via the input bus 82. The accumulator now contains T+60, the index register contains the number 100, and the memory 170 contains the number T+60. Multiplication is then accomplished at step 27 which passes a signal through the OR gate 197 to enable the adder 160 through the OR gate 162 and to enable the AND gate 177 through the OR gate 198. Thus, each time an output appears at step 27 the summed number in the memory 170 has added to it another T+60, and each time that this occurs a further signal on wire 165 decrements the index register by 1. Thus, by repeatedly adding T+60 to the memory and reducing the number in the index register until its content is zero, eventually the number T+60 will have been multiplied by 100. After each time that the number T+60 is added to the memory contents 170, a test is conducted at step 28 by sampling the input on wire 159 to determine whether the index register 155 has yet arrived at zero. If it has not, the programmer returns to step 27. Eventually when the number in the index register 155 arrives at zero the programmer will proceed to step 29, and the multiplication is complete.

The system now proceeds to step 110 of FIG. 2 and prepares to divide into the absolute pressure Pf the number 100(T+60). This begins at step 29 in FIG. 4. It will be recalled that at the end of step 28 the memory 170 contains the produce 100(T+60). Therefore at step 29 an output passes through the OR gate 148 and enables the analog gate 134 which then reads the absolute pressure from the sensor 76 onto the wire 136 whereupon it is converted to digital form in the convertor 81 and loaded into the accumulator on the input bus 82. At step 30, an output passes through the gate 183 and enables the complement circuit 152 which then takes the complement of the accumulator contents and makes is available to the adder through the OR gate 153. At step 31, the division process begins and an output passes through the gate 181 and enables the adder 160 through the OR gate 162. The adder therefore adds the memory contents comprising the aforementioned product and the complement of the absolute pressure Pf. In addition, an output through the gate 182 increments the index register 155 whose content was zero, but is now increasing each time the step 31 is performed. In the step 32 a sample of the adder output is taken on wire 166. Each time the complement of the absolute pressure is added to the contents of the memory, the contents of the memory get smaller. A signal on wire 15a inhibits the gate 151 during division functions of the system, i.e., during steps 13, 31 and 66, so as to prevent the adder taking output from the accumulator 150 when it should be taking output from the complement circuit 152. Otherwise, the gate 151 is normally conductive. Thus, in step 32 a test is made to determine whether the adder has gone through zero. As long as the contents of the adder have not gone through zero, the programmer goes back and performs step 31 again, but when the adder goes through zero the programmer then advances to step 33. The index register now contains the results of the division of 100(T+60) into the absolute gas pressure Pf. In step 33, the contents of the index register 155 is read into the memory by enabling the gate 176 to connect the index register output on the cable 185 into the memory for storage by way of the cable 178.

This begins the step referred to as 111 in FIG. 2 in which the dividend now contained in the memory 170 has a constant 1 added to it. At step 34 an output passes through the OR gate 179 and enables the AND gate 144 which then delivers a constant 1 into the accumulator 150 through the input bus 82. In step 35, an output passes through the OR gates 162 and 193 and enables the adder 160 which then takes the output of the accumulator 150 through the normally enabled gate 151 and through the OR gate 153 and adds it to the contents of the memory 170 arriving at the adder through the cable 161. In step 36, an output passes through the OR gate 194 and the OR gate 198 and enables the AND gate 177 to enter the contents of the adder into the memory 170 by way of the cable 178. The memory now contains the supercompressiblity factor Fpv which is equal to $1+Pf/100(T+60)$. Step 36 in FIG. 4 thus completes the step referenced as 112 in FIG. 2, and the system then proceeds to sub-calculation C.

At the beginning of sub-calculation C, step 115 in FIG. 2, the supercompressibility factor Fpv is stored in the memory, and the results of sub-calculation A are stored in register A, and these 2 stored quantities are to be multiplied together. In order to accomplish this purpose, the programmer delivers an output at step 37 to enable the AND gate 137 through gate 149 and read the contents of register A into the input bus 82 to the accumulator. The programmer then moves on to step 38 which delivers an output through the OR gate 195 to enable the AND gate 154, thereby reading the contents of the accumulator 150 into the index register 155. In step 39 the programmer delivers an output through the OR gate 196 to enable the AND gate 138 and thereby enter the contents of the memory 170 also into the accumulator 150. The system is now ready to begin multiplying, which consists of adding the memory and the accumulator over-and-over again, each time decrementing the index register 155 by 1 until it reads zero. For this purpose, an output is delivered at step 40 through the OR gate 197 to enable the adder 160 which adds the quantity in the accumulator, representing Fpv, to a cumulative quantity which is now contained in the memory, the new sum each time again ending up on the memory because the output through the OR gate 197 also passes through the OR gate 198 and enables the AND gate 177, thereby reading the output of the adder on cable 164 into the memory through cable 178. Having added the supercompressibility factor from the accumulator to the supercompressibility factor in the memory for the first time, at step 41 an input is taken from the wire 159 out of the index register to test whether or not it has yet gone to zero. If not, the programmer then reverts to step 40 and performs another addition of the supercompressibility factor to the contents of the memory 170, and again decrements the index register on wire 165. Thereafter, in step 41 the wire 159 is again tested to determine whether it has gone to zero. If not, the programmer 100 reverts again to step 40, but if the index register has gone to zero the multiplication is completed and the system then proceeds to step 42. At this point, the memory contains the product of the supercompressibility factor Fpv multiplied by the square root of $\Delta P/G(T+460)$.

At step 116 of FIG. 2 this quantity is then multiplied by the constant C' which represents the orifice within the pipeline. At step 42 in FIG. 4 the output from the programmer enables the AND gate 145 which takes the constant C' from the block 95 and introduces it into the accumulator 150 through the input bus 82. At step 43 an output through the gate 195 enables the AND gate 154 and the constant C' is then introduced into the index register 155 from the accumulator 150 through the AND gate 154. At step 44, an output passes from the programmer through the OR gate 196 and enables the AND gate 138 to introduce the contents of the memory 170 also onto the accumulator by way of the cables 161 and 82, thereby making the system ready to commence multiplying. Multiplication is accomplished by an output at step 45 which passes through the OR gate 197 and enables the adder 160 so that the adder adds the contents of the accumulator to the quantity in the memory. An output from step 45 also passes through the OR gate 197 and enables the AND gate 177 so as to store the sum of the two quantities back in the memory again. At the same time, an output on the wire 165 decrements the index register by 1. In step 46 the index register is tested on wire 159 to see whether it has as yet passed through zero, and if not the programmer then returns to step 45 and again adds the contents of the accumulator 150 to the sum appearing in the memory 170 and stores the new sum back in memory again while decrementing the index register. When eventually the index register goes thorugh zero as indicated by wire 159, the programmer moves on to step 47 which corresponds with step 117 in FIG. 2. In this step, the gate 157 is enabled, thereby taking the contents of memory 170 through cable 161 and storing it in the register B. The quantity thus stored in register B comprises $C'Fpv\sqrt{\Delta P/G(T+460)}$.

The system now moves on to sub-calculation D as shown in FIG. 2 in which the first effort is to obtain the square root of the absolute pressure Pf. At step 48, the programmer delivers an output through OR gate 148 to enable the AND gate 134 and thereby place the analog signal representing the absolute gas pressure onto the wire 136, the analog entering the A/D convertor 81 and being delivered as a digital number into the accumulator 150. The next output from the programmer 100 appearing at step 49 passes through the OR gate 192 and enables the AND gate 171 to enter the absolute pressure Pf from the accumulator 150 also into the memory 170. The next step from the programmer is step 50 wherein the AND gate 139 is enabled through the OR gate 168 so that the content of the memory is transferred into register A. In this step, some of the output also passes through the OR gate 140 and resets the memory to zero via the wire 136. Furthermore, part of the output passes through the OR gate 179 and enables the AND gate 144 which then places a constant 1 into the accumulator 150 through the input bus 82. The programmer then moves on to step 51 in which an output passes through the OR gates 187 and 182 to increment the index register 155 to read 1, the output from gate 187 also passing through the OR gate 198 and enables the AND gate 177 thereby connecting the output of the adder 160 through the cable 164 into the memory 170 by way of the cable 178, the adder having been enabled through the gate 162 whereby it adds the contents of the accumulator, which is the number 1, into the zero memory content and inserts the sum thereof into the memory 170, which is the number 1. When the delay runs out as provided by the delay circuit 167 the accumulator is incremented by 2 so that it now contains the number 3. During this square root step after each addition, the output of the comparator is sampled at step 52 to determine whether coincidence has been obtained between the number to be square rooted in register A and the output of the adder 160 which also equals the contents of the memory 170. If these contents do not compare coincidentally the programmer returns to step 51, and performs a new cycle in which the number in the accumulator which is 3 is added to the number in the memory which is 1 and the number 4 is then stored in the memory and compared with the contents of register A for possible coincidence, at the same time incrementing by 1 the index register 155 and incrementing by 2 the accumulator so that it now reads 5. The steps 51 and 52 of the programmer are repeated in this manner until the output of the comparator indicates coincidence in step 52, and at that time the index register contains the square root of the number which was stored in register A.

The programmer then moves on to step 53, which corresponds with step 121 of FIG. 2 in which a constant value equal to the $\sqrt{520/1800}$ is multiplied by the square root contained in the index register. For this purpose, in step 53 the AND gate 146 is enabled and delivers the $\sqrt{520/1800}$ to the input bus 82 and into the accumulator. In step 54 and output passes through the OR gate 192 and enables the AND gate 171 to thereby enter the $\sqrt{520/1800}$ also into the memory 170. The system then proceeds to step 55 in which an output through the OR gate 197 enables the adder through OR gate 162 and also enables the AND gate 177 through the OR gate 198 so that during this step the contents of the accumulator is added to the contents of the memory, and at the same time the signal on wire 165 decrements the index register 155 by 1. In step 56 an input is taken into the programmer from wire 159, and the index register is thereby tested to determine whether or not its content has as yet gone to zero. If not, the system reverts to step 55 and again adds the contents in the accumulator to the contents in the memory, at the same time decrementing the index register again by way of line 165. Again, the index register 155 is tested in step 56 to determine whether its contents has gone to zero. When eventually it does so, the multiplication step 121 is complete and the system then moves on to sub-calculation E.

In sub-calculation E, corresponding with step 123 of FIG. 2, an output appears at step 57 in programmer 100 and this output transfers the contents of register B, which comprises $C'\cdot Fpv \sqrt{\Delta P/G(T+460)}$, into the index register by way of the AND gate 156. At the present time, the memory 170 contains the quantity $\sqrt{Pf \cdot 520/1800}$. At step 58, an output passes from the programmer through the OR gate 168 to enable the gate 139 to load the contents of the memory 170 into register A as well. The output from step 58 also inhibits the normally conductive gate 199. At step 59 the output from the controller passes through an OR gate 149 and enables the AND gate 137 to transfer the contents of register A into the accumulator 150. At this point, the accumulator 150 contains the same information as the memory 170, both containing the quantity $\sqrt{Pf \cdot 520/1800}$, and the index register contains the entire computation results comprising $C'\cdot Fpv \sqrt{\Delta P \cdot Pf \cdot 520/G(T+460)}$. The calculator now goes to step 60 and passes a signal through OR gate 197 and enables the adder through OR gate 162, at the same time enabling the AND gate 177 through the OR gate 198 and decrementing by 1 the index register through the wire 165. In step 61, the index register is tested via wire 159 to determine whether it has reached zero, and if not the system reverts to step 60 and again adds the contents of the accumulator to the memory 170 and decrements by 1 the index register. If the test at step 61 still fails to find that the index register has returned to zero, step 60 is repeated. Eventually when a zero is noted at step 61, the system proceeds to step 62, and at this time the solution of expression (1) is contained within the memory 170 corresponding with storage step 124 in FIG. 2. this quantity comprises the computed gas flow Qh in cubic feet.

At step 62 the system moves on to the last sub-calculation F in which it divides by 1000 the quantiy Qh which at the present time is contained in the memory 170. At this point, a discussion of the programmer steps must digress in order to explain that the register C is intended to preserve the remainder in cubic feet whenever the calculated number of cubic feet has been divided by 1000 in order to find out how many even thousands of cubic feet can be obtained for display in the unit 88, FIG. 3. When 1000 has been divided into the number of cubic feet as many times as it will go, this remainder is then left in register C and is subsequently added to the calculation made during the next cycle of the programmer 100 so that the remainder is not lost. Thus, the first step involved in determining thousands of cubic feet involves the recovery of the remainder stored from the last calculation in register C and the entering of that reminder into the memory 170 before proceeding with the next calculation and division by 1000.

For this purpose in step 62 of the programmer the AND gate 188 is enabled, and it couples the remainder from the prior calculation in register C through the OR gate 153 and into the adder 160. In step 63 the adder is enabled via the OR gates 193 and 162 and the remainder from register C is added to the memory content Qh and this sum is again stored in the memory. At this instant, the memory contains the most recent gas flow calculation, plus the remainder from the next preceding gas flow calculation and conversion into thousands of cubic feet.

The system now seeks to reduce the summed contents of the memory 170 by a constant 1000 to find out how many times it can be done so as to convert the calculated flow of the nearest thousands of cubic feet. For this purpose at step 64 the gate 147 is enabled to load the constant 1000 through the input bus 82 into the accumulator 150. At step 65 an output passes through OR gate 183 and enables the complement circuit 152 to obtain the complement of the number 1000 in the accumulator 150 and make the complement available through the OR gate 153 to the adder 160. At step 66 an output passes through the OR gate 181 and enables the adder through the OR gate 162, thereby adding the complement of 1000 to the total gas flow Qh, which now includes the remainder from the prior cycle of the programmer. Each time this is done a smaller number appears at the output of the adder 160. The output from step 66 not only passes through the OR gate 181 and enables the adder, but it also blocks the gate 151 so as to be sure that it is the complement of the accumulator which is entered into the adder. Moreover, the output at step 66 passes through the OR gate 182 and increments the index register 155 to increase its number from zero to 1. In step 67 the adder is tested via wire 166 to see whether it has gone through zero, and if not, the programmer moves on to step 68 and increments the display counter 87 by 1 to increase the display by 1000 cubic feet of gas. At step 68, the programmer then returns to step 66 in which another output is delivered through the OR gates 181 and 182 and through the OR gate 162. This output enables the adder to again add the complement of 1000 to the content of the memory 170 and store the new further-reduced sum in the memory 170. The programmer moves on to step 67 to again test the adder to see whether it has gone through zero. If not, the programmer moves on to step 68 and increments the counter 87 to add another 1000 cubic feet to the display.

The output each time from the step 68 also enables the AND gate 189 so that the number which comprises the output from the adder is also stored in register C. Thus, register C always contains the most recently calculated remainder number which did not cause the adder to go through zero. When eventually in step 67 the wire 166 indicates that the adder has just gone through zero, the system moves on to step 69 without incrementing the display counter 87 and without again enabling the gate 189. As a result, the prior remainder which is less than 1000 remains in the register C until needed during the next cycle of calculation by the programmer 100.

When the test in step 67 shows that the adder has just gone through zero, the system then moves on to step 69 which is a final step returning the programmer to the START step of the next program cycle, the latter step resetting the memory, the accumulator, and all of the registers except register C which now contains the remainder from the just-concluded calculation cubic feet.

The above explanation describes in detail the solution of expressions (1) and (2) by the system to obtain standard cubic feet of gas per sampling interval, 1800 such samples being taken per hour. The samples are then integrated and multiplied by a scaling factor to provide a display of the calculated flow in terms of thousands of cubic feet while retaining the remainder for inclusion in the next flow calculation. The display itself can if desired be reset by means 89 of any suitable nature, which can comprise either a manual reset if the display 88 is being recorded manually, or else an automatic reset if the display 88 is being recorded automatically. Periodic recording in some form is necessary before the capability of the display 88 is exceeded by the gas flow Qh being accumulated therein.

The present invention is not to be limited to the exact embodiment illustrated and described, for obviously changes may be made within the scope of the following claims.

I claim:

1. A digital calculator of the type including periodically repeating multiple-step program means sequentially actuating digital arithmetic means for calculating the flow of gas through an orifice based upon discretely sampled measurements of gas and flow parameters made in the vicinity of the orifice at the time of each new calculation by solving a flow expression including multiple separable mathematical terms including said parameters and empirical constants, the calculator comprising:
   a. gate means responsive to certain steps in said program for selectively entering sample measurement terms into the calculator as needed during calculations;
   b. analog to digital converter means coupled in series with said gate means and with an input bus of the arithmetic means;
   c. adjustable means for generating said empirical constant terms as digital numbers;
   d. gate means responsive to certain other steps in said program for selectively entering the constant terms at said input bus; and
   e. plural separate storage means in said calculator, said program means including a programmer operative to deliver outputs corresponding with its steps in a sequence thereby to enable said gate means and said arithmetic means to sequentially perform a sub-calculation on each one of said separable terms one at a time thereby to obtain corresponding digital numbers representing those sub-calculations and to temporarily enter those numbers in said storage means, and said programmer being operative to deliver subsequent steps in said sequence to retrieve from said storage means said sub-calculation numbers and re-enter them into said arithmetic means and perform final calculations to complete the solving of said flow expression.

2. In a calculator as set forth in claim 1, said arithmetic means and said separate storage means having bit-capability including a predetermined number of bits, and said programmer including steps actuating said arithmetic means in a sequence operative to perform said sub-calculations upon terms of the expression which are selected such that the respective sub-calculations never result in numbers whose magnitudes exceed the bit-capability of the arithmetic and storage means.

3. In a calculator as set forth in claim 1, said calculator repeatedly solving said flow expression to determine cubic feet of gas flowing during the interval of the calculation; digital display means for displaying the quantity of gas calculated reduced by a scaling factor; means in the arithmetic means for repeatedly deducting said scaling factor from the calculated solution in cubic feet and incrementing said display means, and for entering the difference after each deduction into a remainder register; means operative after each calculation to test the difference to determine whether it has gone through zero; and means responsive to the difference going through zero to leave the next preceeding difference still in the remainder register and omit incrementing the display.

4. In a calculator as set forth in claim 3, said calculator including means operative after solving of said expression for adding the content of the remainder register to the solution of the expression before commencing the steps of deducting said scaling factor.

5. In a calculator as set forth in claim 1, said expression including a gas supercompressibility factor calculatable by solving a second expression having constant terms and variable terms including gas pressure and temperature and serving to compensate the flow expression for the difference in behavior between a perfect gas and the particular gas mixture passing the orifice, and said programmer including steps to actuate the arithmetic means to calculate the supercompressibility factor as one of said sub-calculations performed during each solution of the flow expression.

6. The method of automatically calculating the flow of a gas mixture through an orifice using a fixed program controlling a digital calculator to solve an arithmetic expression having certain empirically determined pre-entered constants; including the steps of:
  a. measuring gas flow parameters including the pressure and temperature and specific gravity of the gas mixture approaching the orifice and including the differential pressure across the orifice;
  b. stepping the program through a sub-series of steps to actuate the calculator to perform a first sub-calculation based on measured parameters including the square root of the differential pressure divided by a term including the specific gravity multiplied by the temperature, and storing a first digital signal representing said first sub-calculation;
  c. stepping the program through a sub-series of steps to actuate the calculator to perform a second sub-calculation including the product of said first digital signal times a constant term representing the orifice constant, and storing a second digital signal representing said second sub-calculation; and
  d. stepping the program through a sub-series of steps to actuate the calculator to perform a third sub-calculation based on measured parameters comprising the square root of a term including the gas pressure and multiplying it by said second digital signal, and storing a third digital signal representing the gas flow and resulting from the third sub-calculation.

7. The method as set forth in claim 6, including the steps of stepping the program through a sub-series of steps to actuate the calculator to determine a supercompressibility factor including a term comprising the gas pressure divided by a term including the temperature, and then multiplying the stored third sub-calculation by said supercompressibility factor to obtain a corrected gas flow.

8. The method as set forth in claim 6, including the steps of cyclically calculating said gas flow; dividing each calculated gas flow by a scaling factor; accumulating the number of times the scaling factor divides into each successively calculated gas flow; and preserving the remainder resulting from integral division by the scaling factor, and adding it to the next calculated gas flow before dividing the latter by said scaling factor.

9. The method of determining the flow of a hydrocarbon gas mixture through an orifice, comprising the steps of measuring the pressure and temperature and specific gravity of the gas mixture approaching the orifice and the differential gas pressure across the orifice; automatically actuating a digital arithmetic calculator controlled by a fixed program to repeatedly calculate the solution of an empirical formula including the expression:

$$Qh = C' \cdot Fpv \sqrt{(\Delta P \cdot Pf \cdot 520)/[G(T+460)]}$$

where Qh is the flow of gas in cubic feet per hour, C' is an orifice constant, Fpv is a supercompressibility factor, Pf is gas pressure within the range of zero to 1200 p.s.i., T is the gas temperature in the range of 30° to 120° F, G is the specific gravity ratio as compared to air and roughly falling between 0.58 and 0.68, and $\Delta P$ is the differential pressure across the orifice; and accumulating the gas flow Qh after each calculation.

10. In the method as set forth in claim 9, the step of calculating the supercompressibility factor Fpv during each new calculation of the gas flow Qh by solving the expression:

$$Fpv = 1 + (Pf)/[100(T+60)]$$

* * * * *